(12) United States Patent
Schuster et al.

(10) Patent No.: US 6,394,512 B1
(45) Date of Patent: *May 28, 2002

(54) VEHICLE BUMPER SYSTEM

(75) Inventors: Peter John Schuster, Dearborn; Gregory Stanley Frederick, Sterling Hts.; Shui-Fang (Ray) Chou, Troy; Jeffrey Leonard Bladow, West Bloomfield, all of MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/737,359

(22) Filed: Dec. 15, 2000

(51) Int. Cl.[7] ............................................ B60R 19/40
(52) U.S. Cl. .................... 293/15; 293/118; 293/119
(58) Field of Search .............................. 293/15, 24, 34, 293/38, 39, 117, 118, 119, 143, 144, 146

(56) References Cited

U.S. PATENT DOCUMENTS

| | | |
|---|---|---|
| 1,150,557 A | 8/1915 | Toland |
| 3,236,552 A | 2/1966 | Percifull |
| 3,913,963 A | 10/1975 | Persicke |
| 3,992,047 A | 11/1976 | Barenyi et al. |
| 4,514,002 A | 4/1985 | McIntosh |
| 4,582,351 A * | 4/1986 | Edwards ...................... 293/118 |
| 5,360,311 A | 11/1994 | Lutz et al. |
| 5,624,143 A * | 4/1997 | Waldschmitt ............... 293/118 |
| 6,089,628 A | 7/2000 | Schuster |

FOREIGN PATENT DOCUMENTS

| | | | | |
|---|---|---|---|---|
| DE | 28 43 670 A1 * | 4/1980 | ................. | 293/118 |
| GB | 2336812 A | 11/1999 | | |
| GB | 2341148 A | 3/2000 | | |
| JP | 6-211092 | 8/1994 | | |

* cited by examiner

*Primary Examiner*—Joseph D. Pape
*Assistant Examiner*—Patricia Engle
(74) *Attorney, Agent, or Firm*—Gigette M. Bejin

(57) ABSTRACT

A pedestrian protection apparatus for a truck is provided. The apparatus includes a bumper member mounted to a vehicle, a linkage, a stiffener, an extendible cross-member and an actuator. The extendible cross-member is mounted on a stiffener which in turn is mounted at each end at a first linkage and a second linkage respectively. The pedestrian protection apparatus may extend out from under the vehicle at speeds greater than a predetermined speed in order to prevent injury to a pedestrian in a collision. The linkages are disposed between the extendible cross-member and the bumper.

23 Claims, 2 Drawing Sheets

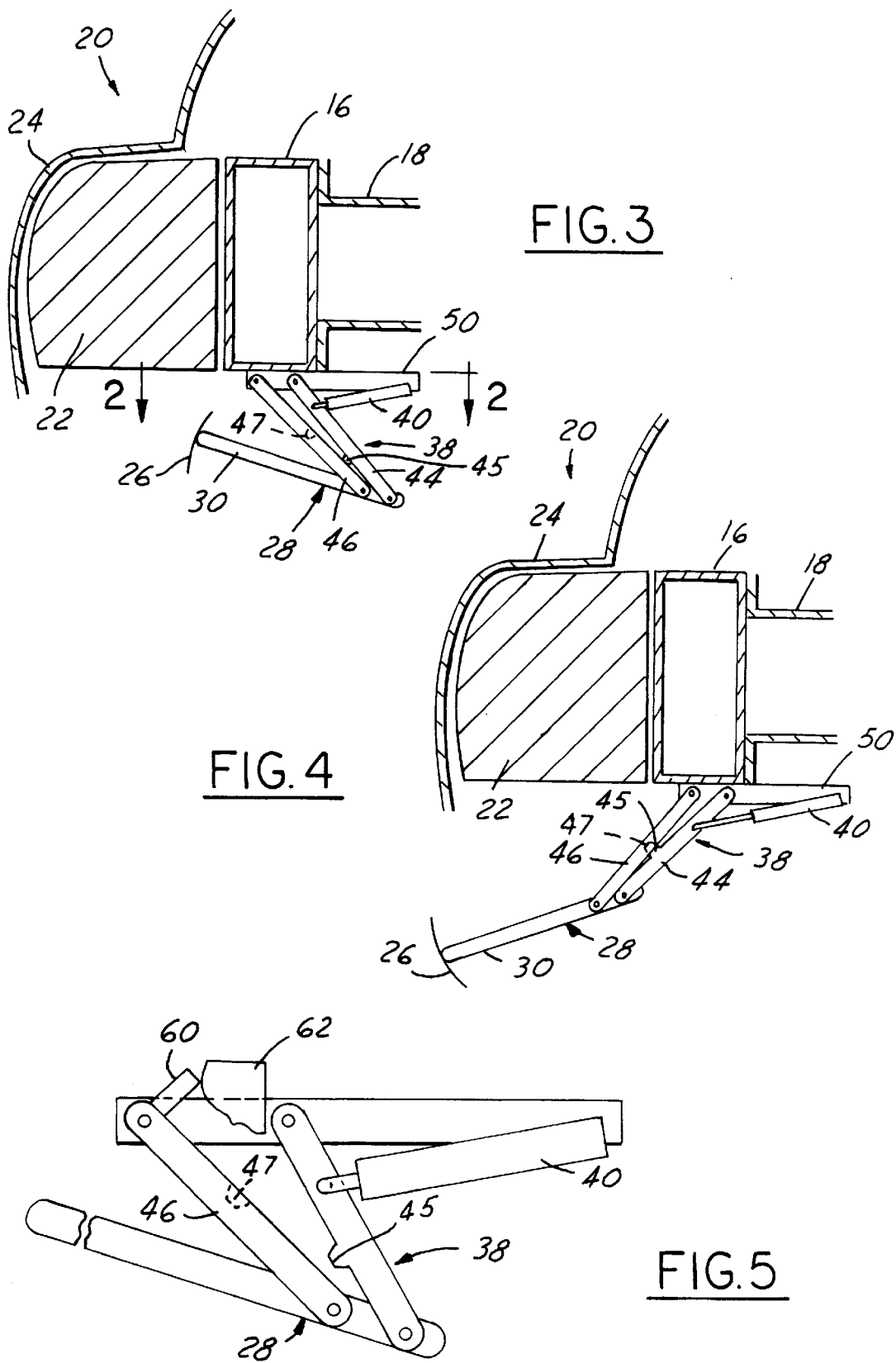

VEHICLE BUMPER SYSTEM

The present invention relates to a retractable apparatus for a vehicle bumper which provides for pedestrian protection in a collision.

BACKGROUND OF THE INVENTION

It is known to provide a bumper system for a front end of a motor vehicle. Typically, the bumper system includes a bumper beam extending transversely and secured to a forward end of a pair of front rails which extend longitudinally and are spaced transversely. The bumper system also includes a bumper extending transversely and secured to the bumper beam. The bumper system may include a fascia disposed over and covering the bumper. However, the above bumper system suffers from the disadvantage that when a pedestrian impacts the bumper system, a lower leg of the pedestrian may bend under the motor vehicle. In order to combat this problem, a bumper system having a stiffener assembly may be implemented.

U.S. Pat. No. 6,089,628 issued to Schuster discloses a stiffener assembly for the bumper system of a motor vehicle. The '628 patent discloses a stiffener assembly which is mounted to a bumper and movable between an up position and a down position based on the speed of the motor vehicle. The stiffener assembly is operative to prevent a pedestrian's leg from bending under the motor vehicle upon impact. However, the stiffener assembly of the '628 patent moves in a vertical direction between an up position and a down position and does not extend beyond the front of the bumper thereby making it more difficult to implement on a truck. Furthermore, there is a greater need for this device to be implemented in trucks which are more likely to have a pedestrian's leg to bend excessively under the vehicle due to greater vehicle height.

Therefore, there is a need in the art to provide a stiffener assembly which maintains the requisite clearance angle at the truck bumper when in a retracted position, yet has a sufficient deployment length to prevent a pedestrian from intruding the underside of the truck.

SUMMARY OF THE INVENTION

Accordingly, it is a principle object of the present invention to provide a stiffener assembly which allows for a greater deployment length in the longitudinal direction of the vehicle.

It is yet another object of the present invention to provide a pedestrian protection apparatus which may be easily mounted on a truck.

It is still another object of the present invention to provide a pedestrian protection apparatus which remains intact when impacted with horizontal loads under a predetermined level.

It is yet another object of the present invention to provide a pedestrian protection apparatus which may deploy and extend from a truck at speeds approximately greater than 10 miles per hour and retract at speeds approximately less than or equal to 10 miles per hour.

It is still another object of the present invention to provide a pedestrian protection apparatus which flexes when impacted upward from a vertical load.

In accordance with the objects and other objects and features of the present invention, a pedestrian protection apparatus for a truck is provided. The apparatus includes a bumper member mounted to a vehicle, a first linkage and a second linkage, an extendible cross-member means, an actuation means, and a stiffener. The extendible cross-member means is mounted on the stiffener. The stiffener having a first end and a second end is mounted at each end to the first linkage and the second linkage. The linkages are operative between a retracted mode and a deployed mode. The linkages extend the stiffener and cross member means out from under the vehicle at speeds greater than a predetermined level in order to prevent a pedestrian from intruding the underside of a vehicle upon collision. The linkage is disposed between the stiffener and the bumper. The linkage has a first locking member and a second locking member and is operative to extend the cross-member means outwardly from the vehicle end. The actuation means in communication with a vehicle speedometer, the actuation means being operative to extend the cross-member means and the linkage outwardly from the vehicle when the vehicle reaches a predetermined speed.

As those skilled in the art will recognize, the embodiments of this invention may vary depending upon the specific requirements of a vehicle. Accordingly, the particular size and shape of the stiffener, cross member, linkage configuration, locking members of the linkage and other components may vary, depending on the particular application.

The above objects and other objects, features, and advantages of the present invention are more readily understood from a review of the attached drawings and accompanying specification and claims.

BRIEF DESCRIPTION OF THE DRAWINGS

FIG. 3 is a cross sectional view of the pedestrian protection apparatus and a portion of a truck of FIG. 1 illustrating the pedestrian protection apparatus in a first mode.

FIG. 4 is a cross-sectional view of the pedestrian protection apparatus and a portion of a truck of FIG. 1 illustrating the pedestrian protection apparatus in a second mode.

FIG. 5 is a cross sectional view of a second embodiment of the pedestrian protection apparatus and a portion of a truck of FIG. 1 illustrating.

DETAILED DESCRIPTION OF THE PREFERRED EMBODIMENT

The present invention provides for an improved pedestrian protection device which may be mounted on a truck yet adequately extends beyond the front of the truck when deployed. Furthermore, the present invention provides for increased flexibility in mounting the protective device to a vehicle.

Figure 1:
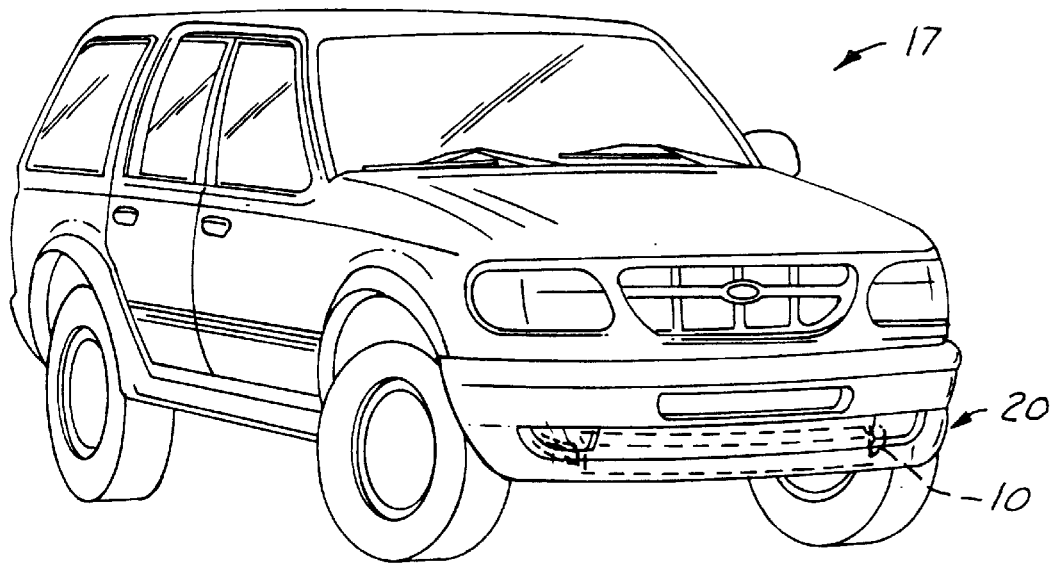
FIG. 1 is a perspective view of the pedestrian protection apparatus according to the present invention, illustrated in operational relationship with a motor vehicle.

With reference to FIG. 1, a perspective view of the present invention 10 is shown as installed on a truck. Trucks are generally positioned high above the ground with a clearance of approximately 2 feet between the bumper 20 and ground level 14. The vertical distance between the bumper 20 and ground level 14 poses the difficulty of adequately mounting a pedestrian protection device 10 to the vehicle 16 in addition to having the pedestrian protection device extend a sufficient distance outward from the underside of the vehicle 17. The truck includes a bumper system which is generally indicated at 20, at a forward end of the truck. The pedestrian protection device 10 is mounted on or near the bumper 12 of the vehicle.

Figure 2:
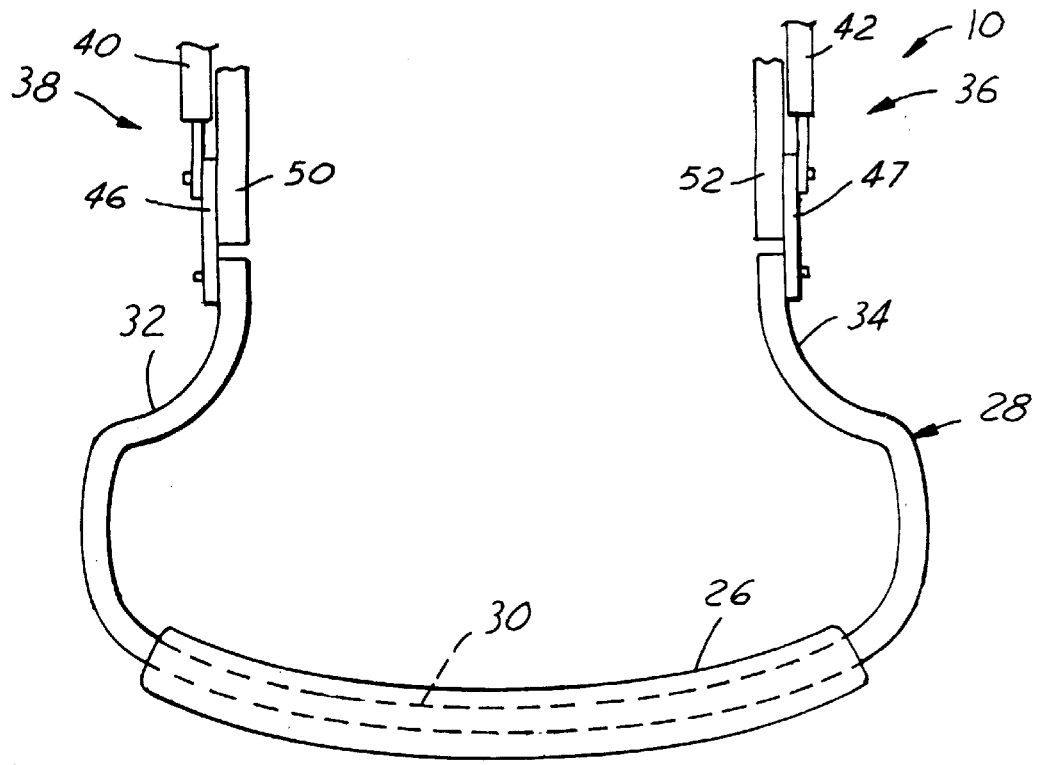
FIG. 2 is a plan view of the pedestrian protection apparatus of FIG. 1.

As illustrated in FIGS. 2 through 4, the pedestrian protection device 10 includes a bumper beam 16. The bumper beam 16 extends transversely and is secured to the forward end of a pair of front rails 18 by suitable means such as welding. The bumper beam 16 is generally a hollow member having a generally rectangular shape. The bumper beam 16 is made of a relatively rigid material such as metal. The bumper system includes a bumper energy absorber 22. The bumper energy absorber 22 extends transversely and is secured to the bumper beam 16 by suitable means such as fasteners (not shown). The bumper energy absorber 22 is generally a solid member having a generally rectangular shape. The bumper energy absorber 22 is made of a relatively deformable material such as foam. The bumper system 20 further includes a fascia 24 extending transversely and downwardly to cover the bumper energy absorber 22. The fascia 24 is secured to the vehicle structure by suitable means such as fasteners (not shown). The fascia 24 is made of a relatively flexible material such as plastic. It should be appreciated that the fascia 24 may extend upwardly to form a grille. It should also be appreciated that the bumper system 20 is conventional and known in the art.

Referring to FIG. 2, the pedestrian protection device includes a cross member means 26 and a stiffener 28. The cross member means may be formed of a plate which is mounted on the stiffener to prevent a pedestrian's leg from intruding under the vehicle. The cross member means may also be formed of a beam mounted on the stiffener where the width of the beam is substantially greater than the stiffener thereby preventing a pedestrian's lower leg from bending under the vehicle.

Referring now to FIGS. 2 through 4, the stiffener of the present invention has a front portion 30 extending transversely and an end portion at a first end 32 and a second end 34 where each end may be formed into a general "C" shape. The stiffener 28 is made of a generally deformable, energy absorbing material such as plastic. The buckling strength of the stiffener 28 is selected to minimize any potential injury to the lower leg of a pedestrian when impacted by the vehicle. The stiffener 28 is preferably a one-piece, integral, continuous, unitary component. However, the stiffener 28 could also be made up of multiple parts that are bonded/welded/fastened together. It should be appreciated that the front portion 30 may be curved or arcuate to smoothly transition with the end portion.

As shown in FIGS. 2, 3, and 4, the pedestrian protection device 10 further includes at least two linkages 36, 38 wherein the first linkage 36 is disposed at a first end 32 of the stiffener 28 and the second linkage 38 is disposed at the second end 34 of the stiffener 28. Each linkage is also connected to an actuator 40, 42 which in turn is in communication with the speedometer. It is preferable to have a pair of actuators 40, 42 such that a first actuator 42 cooperates with the first linkage 36 and a second actuator 40 cooperates with the second linkage 38. The actuators 40, 42 are preferably spaced transversely and have one end attached to the linkage 36, 38 and the other end attached to the bumper beam 16. When the vehicle 17 exceeds approximately ten miles per hour, the first actuator 42 and the second actuator 40 preferably but not necessarily may be activated to extend the linkages 36, 38 and the stiffener 28 into a deployed mode as shown in FIG. 4. Where the vehicle speed decreases such that it is less than or equal to 10 miles per hour, the actuators 42, 40 retract to pull in the linkages 38, 36 and the stiffener 28 thereby maintaining the required approach angle for trucks between the ground line, front wheel and bumper. It should also be appreciated that the pedestrian protection apparatus is not required in a deployed mode at lower speeds given that there is a reduced tendency of the pedestrian's leg to bend under the vehicle in low speed collisions.

The first and second actuators 40, 42 of the present invention may be linear actuators as shown in FIGS. 3 and 4, or the actuators may be formed of a rotational actuator which is disposed within one of the pivots for each of the linkages 36, 38. The linear actuator may be powered by a screw drive or may be powered by a solenoid. The actuators implemented in FIGS. 3 and 4 are similar to actuators used in power door locks and is conventional and known in the art. However, there are several other suitable means such as gas cylinders which may be employed for deploying the pedestrian protection apparatus.

Each linkage includes at least two locking members. The two locking members 44, 46 may be formed of different mechanisms. The first mechanism for the two locking members is where the first locking member 44 includes a tab 45 and the second locking member 46 defines a groove 47, aperture, or slot for receiving the tab 45. The groove, aperture or slot may be defined entirely by the second locking member 46 or it may be defined by a bracket or other member fastened to the second locking member 46. The tab 45 of the first locking member 44 fits into the groove 47, aperture, or slot of the second locking member 46 upon deployment of the pedestrian protection apparatus. The interfit between the two locking members 44, 46 prevents horizontal displacement of the pedestrian protection apparatus 10 when the apparatus 10 is subjected to horizontal loads under a predetermined level. Pedestrian impacts generally apply the horizontal loads under a predetermined level. Accordingly, the apparatus remains intact and prevents a pedestrian's leg from being submerged underneath a truck.

However, in cases where the loads exceed a predetermined level, such as vehicle collision against a wall, a tree or another vehicle, the tab of the first locking member 44 is forced out of the slot of the second locking member 46 to allow the apparatus 10 to flex under the load thereby absorbing energy from the impact.

As shown in FIGS. 3 and 4, the pedestrian protection apparatus 10 is also capable of flexing when subjected to any vertical loads thereby preventing any damage to the vehicle should the vehicle encounter rough terrain. As the apparatus is pushed upward, the locking members separate thereby releasing the tab 45 from its position in the groove 47, slot, or aperture.

The pedestrian protection apparatus 10 also preferably includes a first bracket 52 and a second bracket 50 which are mounted to the bumper. The first bracket 52 and the second bracket 50 serve as mounting points for the first linkage 36 and the second linkage 38 respectively.

Now referring to FIG. 5, the first and second locking members 60, 62 are shown in a cam 62 and follower 60 arrangement. In this embodiment, the cam 62 prevents horizontal displacement of the linkage 38 and the stiffener 28 when subjected to a horizontal load under a predetermined level. When the horizontal loads exceed the predetermined level, the follower 60 proceeds along the cam 62 to allow the stiffener 28 to move toward the rear of the vehicle.

While embodiments of the invention have been illustrated and described, it is not intended that these embodiments illustrate and describe all possible forms of the invention. The lengths and attachment locations of the locking members and other components will be vehicle specific, but designed to provide for a retracted and an outwardly deployed stiffener as illustrated. Therefore, the words used in the specification are words of description rather than limitation, and it is understood that various changes may be made without departing from the spirit and scope of the invention.

What is claimed is:

1. A vehicle bumper assembly for reducing pedestrian injury, the bumper assembly comprising:

a bumper member mounted to a vehicle;

a stiffener operatively connected to the bumper member and movable between an up position to a forward and down position;

a cross-member mounted on the stiffener and being operative to evenly distribute loads on a pedestrian leg upon impact;

a first linkage disposed between a first end of the stiffener and the bumper member;

a second linkage disposed between a second end of the stiffener and the bumper member, the first and second linkages each having a first locking member and a second locking member, the linkage being operative to extend the stiffener and the cross-member means outwardly from the vehicle end; and an actuator in communication with a vehicle speedometer, the actuator being operative to extend the stiffener, the cross-member, and the linkage down and outwardly from the vehicle when the vehicle reaches a predetermined speed.

2. The bumper assembly defined in claim 1 wherein the linkage prevents horizontal displacement of the cross-member when subjected to a horizontal load under a predetermined level.

3. The bumper assembly defined in claim 1 wherein the first locking member includes a tab and the second locking member defines an aperture for engaging with the tab to prevent horizontal displacement of the linkage and the cross-member in a collision.

4. The bumper assembly defined in claim 2 wherein the first locking member includes a tab and the second locking member defines an aperture for engaging with the tab to prevent horizontal displacement of the linkage and the cross-member.

5. The bumper assembly defined in claim 1 wherein the first locking member is a cam and the second locking member is a follower such that the cam prevents horizontal displacement of the linkage and cross-member means when subjected to a horizontal load under a predetermined level.

6. The bumper assembly defined in claim 1 wherein the first locking member and the second locking member disengage and move apart from one another when the cross-member means is subjected to a vertical load.

7. The bumper assembly defined in claim 1 wherein the actuator is a gas cylinder.

8. The bumper assembly defined in claim 1 wherein the actuator is a rotational actuator disposed within a pivot of the linkage.

9. The bumper assembly defined in claim 1 wherein the actuator is a linear actuator powered by a screw drive.

10. The bumper assembly defined in claim 1 wherein the actuator is a linear actuator powered by a solenoid.

11. The bumper assembly defined in claim 1 wherein the cross-member is a stiffener plate.

12. The bumper assembly defined in claim 1 wherein the cross-member is a stiffener beam.

13. A vehicle bumper system for reducing pedestrian injury in a collision, the vehicle bumper system comprising:

a bumper mounted to a vehicle;

a stiffener operatively connected to the bumper and movable between a retracted position and an outwardly deployed position;

a cross member mounted on the stiffener for evenly distributing loads across the stiffener upon impact;

and a first linkage and a second linkage wherein the first and second linkage each comprises, a first linkage member mounted to the bumper;

a second linkage member mounted to cross-member means;

a third linkage member having a first end and a second end, the first end being pivotally mounted to the first linkage member and the second end being pivotally mounted to the second linkage member;

a fourth linkage member having a third end and a fourth end, the third end being pivotally mounted to the first linkage member and the fourth end being pivotally mounted on the second linkage member; and an actuator mounted on the first linkage member and being in communication with the vehicle speedometer, the actuator being operative to extend the cross-member outwardly from the vehicle via the second, third and fourth linkage members such that the third linkage member engages with the fourth linkage member into a locked position preventing horizontal displacement of the cross-member when subjected to horizontal loads under a predetermined level.

14. The vehicle bumper system defined in claim 13 wherein the actuator is a gas cylinder.

15. The vehicle bumper system defined in claim 13 wherein the actuator is a rotational actuator disposed within a pivot of the linkage.

16. The vehicle bumper system defined in claim 13 wherein the actuator is a linear actuator powered by a screw drive.

17. The vehicle bumper system defined in claim 13 wherein the actuator is a linear actuator powered by a solenoid.

18. The vehicle bumper system defined in claim 13 wherein the cross-member is a stiffener plate.

19. The vehicle bumper system defined in claim 13 wherein the cross-member is a stiffener beam.

20. The vehicle bumper system defined in claim 13 wherein the third linkage members each include a tab and the fourth linkage members each define an aperture for engagement with the tab to prevent horizontal displacement of the cross-member.

21. The vehicle bumper system defined in claim 13 wherein the third and fourth linkage members disengage when subjected to a vertical load.

22. A bumper assembly for reducing pedestrian injury, the bumper assembly comprising:

a bumper member mounted to a vehicle;

a stiffener operatively connected to the bumper member and movable between an up position to a forward and down position;

a cross-member mounted on the stiffener and being operative to evenly distribute loads on a pedestrian leg upon impact;

a first linkage disposed between a first end of the stiffener and the bumper member;

a second linkage disposed between a second end of the stiffener and the bumper member, the first and second linkages each having a first locking member and a second locking member wherein the first locking member includes a tab and the second locking member defines an aperture for engaging with the tab to prevent horizontal displacement of the linkage and the cross-member in a collision, the first and second linkages being operative to extend the stiffener and the cross-member means outwardly from the vehicle end; and an actuator in communication with a vehicle speedometer, the actuator being operative to extend the stiffener, the cross-member, and the linkage down and outwardly from the vehicle when the vehicle reaches a predetermined speed.

23. A bumper assembly for reducing pedestrian injury, the bumper assembly comprising:

a bumper member mounted to a vehicle;

a stiffener operatively connected to the bumper member and movable between an up position to a forward and down position;

a cross-member mounted on the stiffener and being operative to evenly distribute loads on a pedestrian leg upon impact;

a first linkage disposed between a first end of the stiffener and the bumper member;

a second linkage disposed between a second end of the stiffener and the bumper member, the first and second linkages each having a first locking member and a second locking member wherein the first locking member is a cam and the second locking member is a follower such that the cam prevents horizontal displacement of the linkage and cross-member means when subjected to a horizontal load under a predetermined level, the linkage being operative to extend the stiffener and the cross-member means outwardly from the vehicle end; and an actuator in communication with a vehicle speedometer, the actuator being operative to extend the stiffener, the cross-member, and the linkage down and outwardly from the vehicle when the vehicle reaches a predetermined speed.

* * * * *